W. H. LEAVITT.
BINDING ATTACHMENT FOR BALING PRESSES.
APPLICATION FILED SEPT. 26, 1919.
1,348,180.
Patented Aug. 3, 1920.
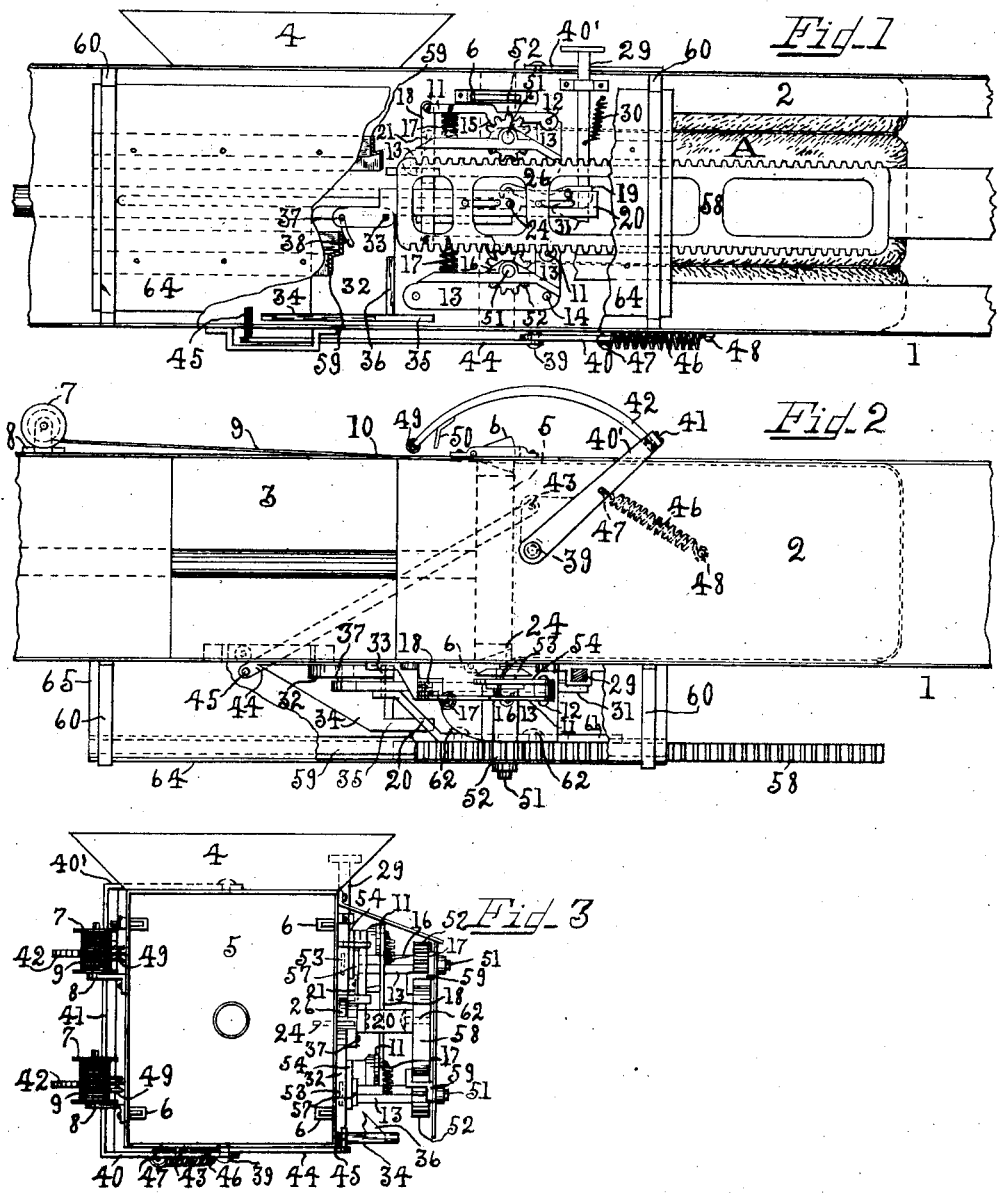

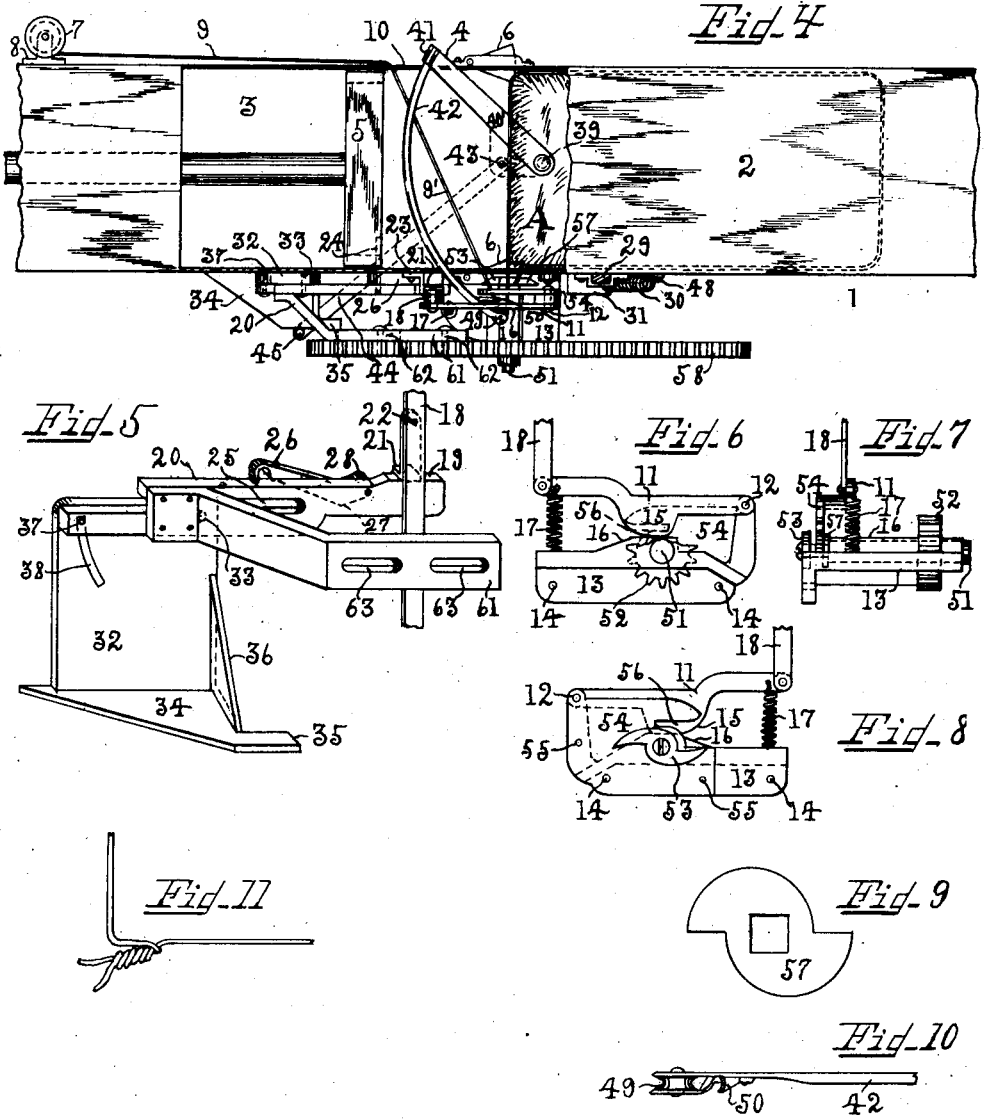

UNITED STATES PATENT OFFICE.

WILLIAM H. LEAVITT, OF WICHITA FALLS, TEXAS.

BINDING ATTACHMENT FOR BALING-PRESSES.

1,348,180. Specification of Letters Patent. Patented Aug. 3, 1920.

Application filed September 26, 1919. Serial No. 326,453.

*To all whom it may concern:*

Be it known that I, WILLIAM H. LEAVITT, a citizen of the United States, residing at Wichita Falls, in the county of Wichita and State of Texas, have invented certain new and useful Improvements in Binding Attachments for Baling-Presses, of which the following is a specification.

My invention relates to bale binding devices for baling-presses, and my object is to provide means for taking suitable wire from spools and binding each bale as formed therewith, shears for severing the wire into bale-ties, and devices for twisting the ends of the bale ties together so that they will effectually hold the bale in shape.

Other objects of the invention will hereinafter appear, and in order that said invention may be fully understood, reference will now be made to the accompanying drawings in which:

Figure 1 shows a broken side elevation of a baling press provided with my attachment, the various elements thereof occupying their normal positions. Fig. 2 is a plan view of the same. Fig. 3 is an end view of Fig. 1. Fig. 4 shows a broken plan view of a baling-press with the needles and one twister in their operative positions, the upper twister being removed. Figs. 5 to 11 inclusive are enlarged detail views—5 being a view in perspective of a bracket operatively connecting the twister and other mechanism with the press plunger. Fig. 6 is a side view of the wire holding and twisting mechanism. Fig. 7 is a front view of the same. Fig. 8 is a view of the opposite side to that of Fig. 6. Fig. 9 is a side view of the shears for cutting the wire into baleties. Fig. 10 is a view of the forward terminal of a needle. Fig. 11 is a detail of a bale-tie formed by my attachment.

Corresponding and like parts are referred to in the following description and indicated in the several views of the drawings by the same reference characters.

1 designates a baling-press of ordinary or preferred type, consisting in the present instance of a baling-case 2, having a feed-opening 3, a hopper 4, a plunger 5 driven in the usual manner, and retainers 6. Said press is also provided with the customary driving gears and the carrying-wheels, which parts have been removed in the present instance to simplify the drawings.

7 designates a pair of spools mounted in brackets 8 secured to one side of the baling-case, said spools carry wires 9, from which the bale-ties for binding the bales are cut. To tie the initial bale the free ends of said wires are passed through slits 10 in the side of the press, thence transversely through the baling-case, as indicated by 9' Fig. 4, and are engaged by a pair of wire holders 11. After this initial threading, the machine does its own threading automatically, that is to say after a bale has been formed and the cutting mechanism has severed the twisted wire (as will be more fully explained hereinafter), the wires are left stretched across the baling chamber just as they were when initially threaded.

The wire holders 11 are pivotally connected at 12, to brackets 13 secured to the adjacent side of the baling case by bolts or rivets through apertures 14. A downwardly extended and curved portion 15 is formed midway between the ends of the holders 11, beneath which the wires are passed, and normally held in engagement with raised seats 16 on the brackets by retractile springs 17, secured at their ends to said arms and to the brackets 13. The forwardly extended ends of the holders 11 are connected by a vertical bar 18, actuated at the proper time by the raised portion 19 of the bracket 20, Fig. 5, to lift the holders to receive the wires, and then, through the intermediacy of intervening parts, it is released for the holders to retain them. When the bracket 20 moves forwardly, the raised portion 19 passes beneath a swinging L shaped dog 21 pivotally connected to the inner side of the bar 18, at 22, and is held parallel with said bar by a stop 23 secured to the side of the press, but is free to swing out of the path of the portion 19 on the reverse stroke of the bracket, thereby leaving the holders in engagement with the wires during the formation of a bale.

To the side of the plunger 5 is secured a laterally projecting pin 24, that passes through a longitudinal slot in the side of the press, and extends nearly through a slot 25 in the bracket 20. A hook 26 having an inclined lower surface 27 is pivoted to the side of the bracket at 28, and held out of engagement with the pin 24 by a vertically slidable lever 29, yieldingly held at its upward extremity of movement by a spring 30, a projecting flange 31 at the bottom end of the lever passes beneath the inclined surface 27 of the hook, normally retaining it lifted from engagement with the pin 24. The bracket 20 serves to bring the wiring mechanism, and the twisting mechanism into play at the proper time with respect to the movement of the plunger and completion of the bale, and it also carries actuating means for the needle bars, comprising a rectangular plate 32, pivoted to its side at 33, a wedge shaped lateral extension 34 at the bottom edge of the plate having a rectangular portion 35, and a brace 36. A pin 37 in the bracket 20 enters a curved slot 38 in the plate 32 and normally engages the upper end of said slot but the plate is permitted to swing upward from the pin.

In the particular embodiment illustrated in the drawings, two wire feeding arms or needles are shown, but it is obvious that the number may be varied to suit circumstances, two wires being sufficient for ordinary bales. To the bottom of the baling-case at 39 is pivoted an arm 40, and to the top an arm 40' that extends radially beyond the side of the press and are joined by an integral vertical extension 41, to which the needles 42 are secured. To the arm 40, at 43 is connected a pull-bar 44 that extends diagonally forwardly of the press box and slightly beyond the side thereof, to which extended end an upstanding pin 45 is secured; said pin being in the path of the travel of the wedge 34, the angular edge of which is designed to be forced between said pin and the adjacent side of the press, thus imparting a swinging movement to the arms, and passing the needles through the baling chamber. A coiled spring 46 connected to the arm 40 at 47, and to the bottom of the press at 48, quickly returns the arms and needles to their normal position when the wedge passes beyond the pin 45. The needles 42 approximate ordinary construction and are provided at their forward terminals with eyes containing sheaves 49 and tangs 50, adapted to engage the wires and draw them across the baling chamber in the rear of each bale A, Fig. 4, when the wires are engaged by a pair of twisters. The construction and operation of the wire twisting mechanism and of the wire cutting mechanism will now be described in more extended detail.

As previously stated, the baling wires are carried by the needles to the two holders 15, and in the brackets 13 are journaled transverse shafts 51, to the outer ends of which are secured spur gears 52, and to the inner ends, wire twisters 53; said twisters being adjacent the plates 54 secured to the brackets by rivets 55, and opposite slits in the side of the press chamber, through which slits the wires pass, they also pass through horizontal slots 56 in the plates, to the holders 15. It being understood that the needles are advanced across the press chamber while the plunger of the press is returning from its compression stroke, as shown in Fig. 4. The wires are twisted at a point between the twisters 53 and the bale, and the cutting devices carried by the shafts 51 sever the twisted wires at a point between the twisted ends and the knife 57. In the form shown in the drawings, the cutting device consists of a revolving knife 57, Fig. 9, which coöperates with the face of the plate 54 to cut the wires, and is reversed in direction whenever the twisting mechanism is reversed.

A double rack-bar 58 is adapted to reciprocate between the twisters and is so arranged that the teeth on the bar engage the teeth of the associated twister gears. Normally, however, or during the formation of a bale, the rack and system of gearing is idle. The rack-bar is slidably supported in guides 59, secured to brackets 60 attached to the side of the press, and is operatively connected to the bar 61 of the bracket 20 by stud bolts 62, that pass loosely through slots 63 in the bracket bar and are screw threaded in said rack bar. The whole tying mechanism may be inclosed by sides 64, and cover 65 secured to the bracket 60.

Assuming that the bale-wires have been properly threaded through slits 10 in the baling-case, and their free ends are firmly engaged by the holders 15, which bind them against the seats 16, the operation of binding the initial bale, is substantially as follows:—As the charges of hay are succesively placed in the baling-chamber, they are advanced at each compression stroke of the plunger, and the foremost charge contacts with the wires and pushes the same backward therewith. When the bale is formed by said charges, and the plunger is moving forward on its compression stroke, the lever 29 is pressed downward by the feeder, engaging the hook 26 with the pin 24 of the plunger, so that when the latter makes its return stroke, the bracket 20, with its attachments will be drawn backward therewith. When the plunger has receded out of the path of the travel of the needles through the press-chamber, the wedge 34 passes between the pin 45 and the side of the press, swinging the needle bars transversely through the baling-case, and in the rear of the bale to the position shown in Fig. 4. Immediately preceding the completion of the needle stroke, the bracket 20 has moved the length of slots 63 and the twisting device started, causing one of the twister fingers to hook the wire that is in the holder 15 and through the slot 56 in the plate 54, bending it down against the plate, when it is sheared off, on the opposite side of the plate by one of the knives 57, leaving a short piece of wire in the holder. At this time the raised portion 19 of the bracket 20 passes beneath the dog 21, momentarily lifting the bar 18, which in turn raises the holders 15 when the wires carried by the needles are placed in position, wiping out the short piece of wire, which slides off the inclined end of the bracket 13, and the part 19 passes from beneath the dog, leaving the holders free to retain the wires, which are immediately caught by the opposite twister finger and then cut by the opposite knife, leaving the loose end of the wire held by the wire holder. The extension 35 of the wedge allows the needles to remain momentarily stationary, giving the holders, etc., time to act. When the plunger again starts on a compression stroke, the bracket 20 will move to the opposite end of the slots 63 when the rack will be actuated, causing the twisters to rotate backward, releasing the ends of the twisted wires, and when reaching the extreme compression stroke the lever 29 will lift the latch 26, leaving the mechanism in its original position, when a charge of hay may be put in, starting another bale.

The needles and the rest of the attachments are only actuated on the completion of a bale, and then only during one stroke, forward and back of the plunger. The connecting hook 26 being automatically lifted from engagement with the pin 24 at the end of the forward stroke by contact of the lower inclined edge with the flange 31, permitting the passage of the pin in and out of the bracket slot 25 without reciprocating the bracket.

Having thus described my invention, what I claim is:—

1. The combination with a baling-press, of means for placing bale-ties around each bale, twisters for twisting or tying the ends of the bale-ties together, shafts on which the twisters are mounted, wire cutting knives and gears on said shaft, a rack engaging said gears for operating said twisting and cutting members in alternately reverse directions for twisting and severing the wires, and means actuated by the baling-press for imparting intermittent reciprocating motion to said rack.

2. The combination with a baling-press, of twisters for twisting or tying the ends of bale-ties after they have been placed around each bale, a rack for rotating said twisters, a bracket for sliding said rack back and forth, said rack being provided with a latch, a laterally projecting pin on the plunger of the press adapted to engage said latch, and means actuated by the baling-press for imparting intermittent reciprocating motion to said bracket and rack.

3. The combination with a baling-press, of means for placing wire around each bale, shears for severing the wire into bale-ties, means including a shaft for actuating said shears, a gear wheel on said shaft, a rack for imparting intermittent motion to the gear wheel, and a bracket actuated by the press-plunger to operate said rack.

4. The combination with a baling-press, of means for placing wire around each bale, twisters for twisting or tying the ends of the ties, shears for severing the wire into bale-ties, means including a shaft for actuating said twisters and shears, a gear wheel on said shaft, a rack for imparting intermittent motion to the gear wheel, a bracket actuated by the press plunger to operate said rack, and a wedge shaped member carried by the bracket to actuate the wire placing means, wire twisting, and wire severing mechanism.

In testimony whereof I affix my signature.

WILLIAM H. LEAVITT.